United States Patent [19]

Ishikawa

[11] 4,129,043

[45] Dec. 12, 1978

[54] ACCESSORY DRIVE

[75] Inventor: Yoshikazu Ishikawa, Chofu, Japan

[73] Assignee: Nissan Motor Company, Limited, Yokohama, Japan

[21] Appl. No.: 768,877

[22] Filed: Feb. 15, 1977

[30] Foreign Application Priority Data

Feb. 17, 1976 [JP] Japan ............................ 51/17948[U]

[51] Int. Cl.$^2$ ......................... F16H 7/00; F16H 37/00; F02F 7/00

[52] U.S. Cl. ...................................... 74/219; 74/15.63; 74/15.84; 123/195 A

[58] Field of Search .............. 123/195 A, 198 C, 90.6, 123/90.17, 90.27; 74/219, 15.63, 15.84

[56] References Cited

U.S. PATENT DOCUMENTS

| | | | |
|---|---|---|---|
| 3,204,468 | 9/1965 | Ruoff | 74/15.63 X |
| 3,209,604 | 10/1965 | Mitchell et al. | 74/15.63 |
| 3,352,293 | 11/1967 | Hulten | 123/90.38 X |

FOREIGN PATENT DOCUMENTS

| | | | |
|---|---|---|---|
| 177604 | 2/1954 | Austria | 123/90.38 |
| 365476 | 12/1922 | Fed. Rep. of Germany | 123/90.38 |
| 2041964 | 5/1971 | Fed. Rep. of Germany | 123/90.38 |
| 2502100 | 7/1975 | Fed. Rep. of Germany | 123/90.38 |
| 241746 | 10/1947 | Switzerland | 123/90.38 |

*Primary Examiner*—Leonard H. Gerin
*Attorney, Agent, or Firm*—Bacon & Thomas

[57] ABSTRACT

An engine compartment has accommodated therein not only a transversely mounted engine but also accessories within a space available adjacent the engine and over a transmission. The accessories are driven by an accessory drive shaft which transmits torque from a crankshaft of the engine to the accessories. The accessory drive shaft is rotatably supported by the engine. The drive torque is transmitted from a front end of the crankshaft to the accessories through the accessory drive shaft.

5 Claims, 2 Drawing Figures

ACCESSORY DRIVE

BACKGROUND OF THE INVENTION

The present invention relates to an accessory drive for a car with a transversely mounted engine.

In conventional cars with a transversely mounted engine, such as a car with a front engine front drive (abbreviated as FF car) or a car with a rear engine rear drive (abbreviated as RR car), an engine compartment has accommodated therein not only an engine, but also a transmission, a final drive, accessories and their associated devices. Nowadays, there is the tendency to arrange within the engine compartment accessories for an exhaust purifying device and an air conditioner. These accessories may include a thermal reactor, an air pump for the secondary air supply, a cooler compressor and a cooler condenser.

Therefore some difficulties have arisen in arrangeing the accessories for the exhaust purifying device and the air conditioner within the engine compartment.

To solve these it was proposed that the accessories be disposed on or adjacent the front end of a transversely mounted engine. However, employing such arrangement will require a transversely wide engine compartment.

Nowadays, it is proposed to use a space over a transmission installed adjacent the rear end of a transversely mounted engine for accommodation of such accessories in order to make the whole assembly in the engine compartment compact.

As some of the accesories must be driven by the engine, the constructional difficulty arises in driving them by the engine crankshaft if they are so arranged. It has been proposed to drive them from the engine cam shaft. However, the rotational speed of the cam shaft is half of the rotational speed of the crankshaft and is not high enough for driving the accessories thus requiring a step-up device using such as a gear drive or a belt drive. The use of the gear drive has a cost disadvantage because the manufacturing cost of gears are expensive, while the use of belt drive has a disadvantage that a large one of a pair of pulleys occupies a relatively large space.

SUMMARY OF THE INVENTION

It is therefore an object of the present invention to provide an accessory drive, manufacturing cost of which is relatively low and installation of which will not occupy a large space.

It is another object of the present invention to provide an accessory drive for accessories located in a space over a transmission installed adjacent the rear end of a transversely mounted engine, by which accessory drive the torque is transmitted from the front end of the engine crankshaft to the accessories.

BRIEF DESCRIPTION OF THE DRAWINGS

The present invention will be described hereinafter with reference to the accompanying drawings, in which.

DESCRIPTION OF THE INVENTION

Figure 1:
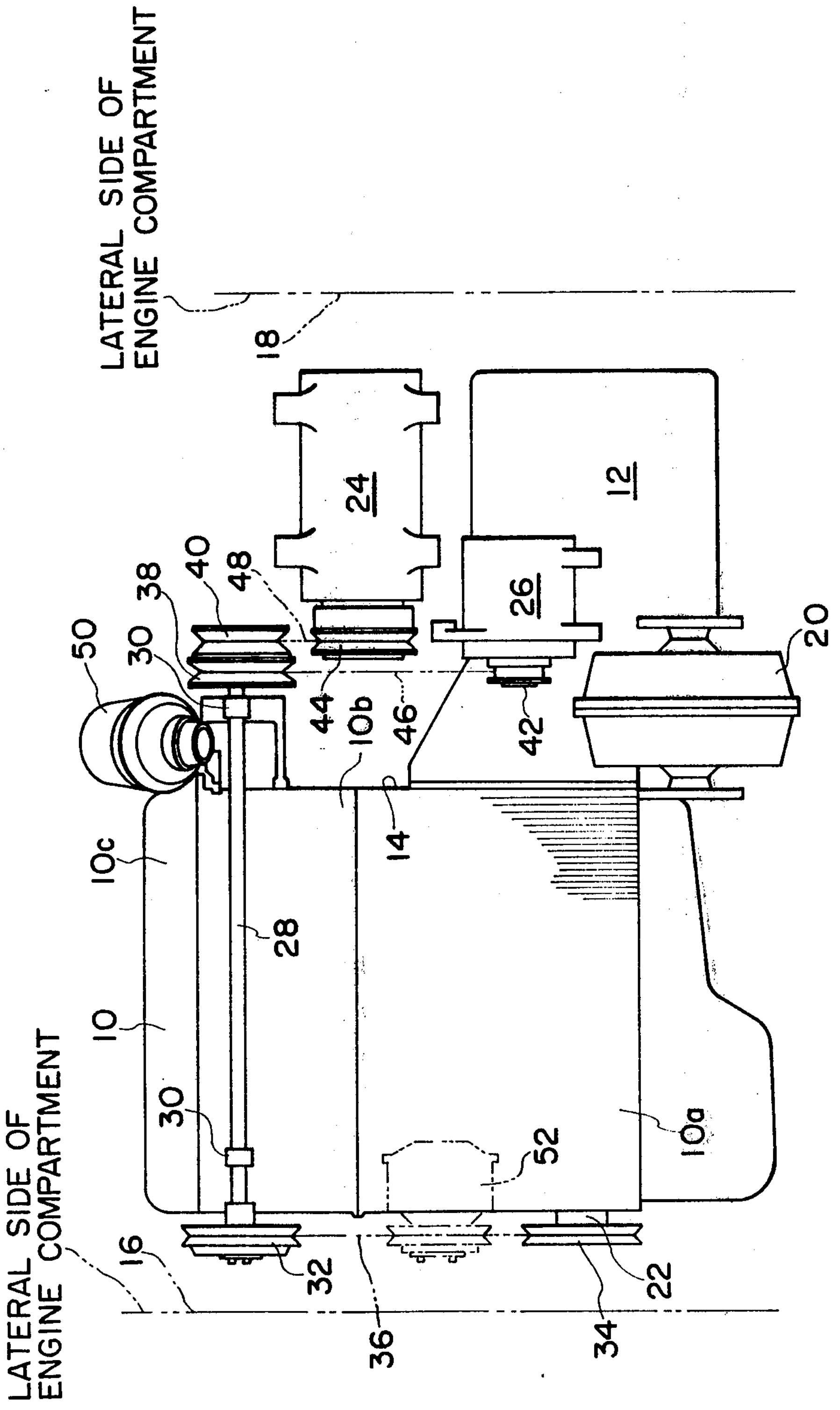
FIG. 1 is a transverse section of an engine compartment showing a side view of a transversely mounted engine and a first embodiment of an accessory drive according to the present invention.

In the embodiment shown in FIG. 1, 10 denotes an engine of a vehicle, the engine axis extending transversely of the vehicle. A transmission 12 is arranged adjacent one axial end 14 of the engine 10 likewise transversely of the engine. The engine 10 and the transmission 12 are in an engine compartment of the vehicle, the lateral sides of which are denoted 16 and 18. Also arranged in the engine compartment is a final drive 20 driving wheels, not shown, of the vehicle. Driving torque is transmitted from a crankshaft 22 of the engine 10 to the driving wheels through the transmission 12 and the final drive 20.

The transmission 12 is arranged adjacent an engine block 10*a* of the engine 10 endwise so that a considerable space is available in the engine compartment above the transmission 12.

Accessories, such as a cooler condenser 24 and an air pump 26, are arranged in this space by any suitable means. To drive the cooler condenser 24 and the air pump 26, an accessary drive shaft 28 is rotatably supported on one side of the engine 10 by two brackets 30 secured to a cylinder head 10*b* of the engine 10 at two axially spaced locations, each bracket being provided with a bearing for rotatably supporting the shaft 28. The shaft 28 carries an input pulley 32 in coplanar relation with a pulley 34 carried by the crankshaft 22 on the end thereof remote from the transmission 12. The pulleys 32 and 34 are of the same diameter and form a belt drive mechanism together with a belt 36. Two or dual output pulleys 38, 40 carried by the shaft 28 are in coplanar relation with a pulley 42 of the air pump 26 and a pulley 44 of the cooler condenser 24, respectively. With a belt 46, the pulleys 38 and 42 form a belt drive mechanism, while, with a belt 48, the pulleys 40 and 44 form a belt drive mechanism.

In FIG. 1, 50 denotes a distributor operatively connected with a cam shaft, not shown, and 52 a dynamo.

When during operation of the engine 10, the crankshaft 22 rotates, the pulley 34 will drive the pulley 32 rotating the shaft 28 and the pulleys 38 and 40 causing the pulleys 38 and 40 to drive the respective pulleys 42 and 44, thus driving the air pump 26 and cooler condenser 24. Since the air pump 26 and cooler condenser 24 are driven by the crankshaft 22, the necessity of using a larger diameter pulley for the purpose of increasing rotation speed, has been eliminated. Thus the whole assembly has been made compact. Since the accessories are arranged in the space available above the transmission 12, it is not necessary to increase the width of the engine compartment for accommodation of such accessories.

If desired, the brackets 30 may be secured to a rocker cover 10*c* or the cylinder block 10*a*.

Figure 2:
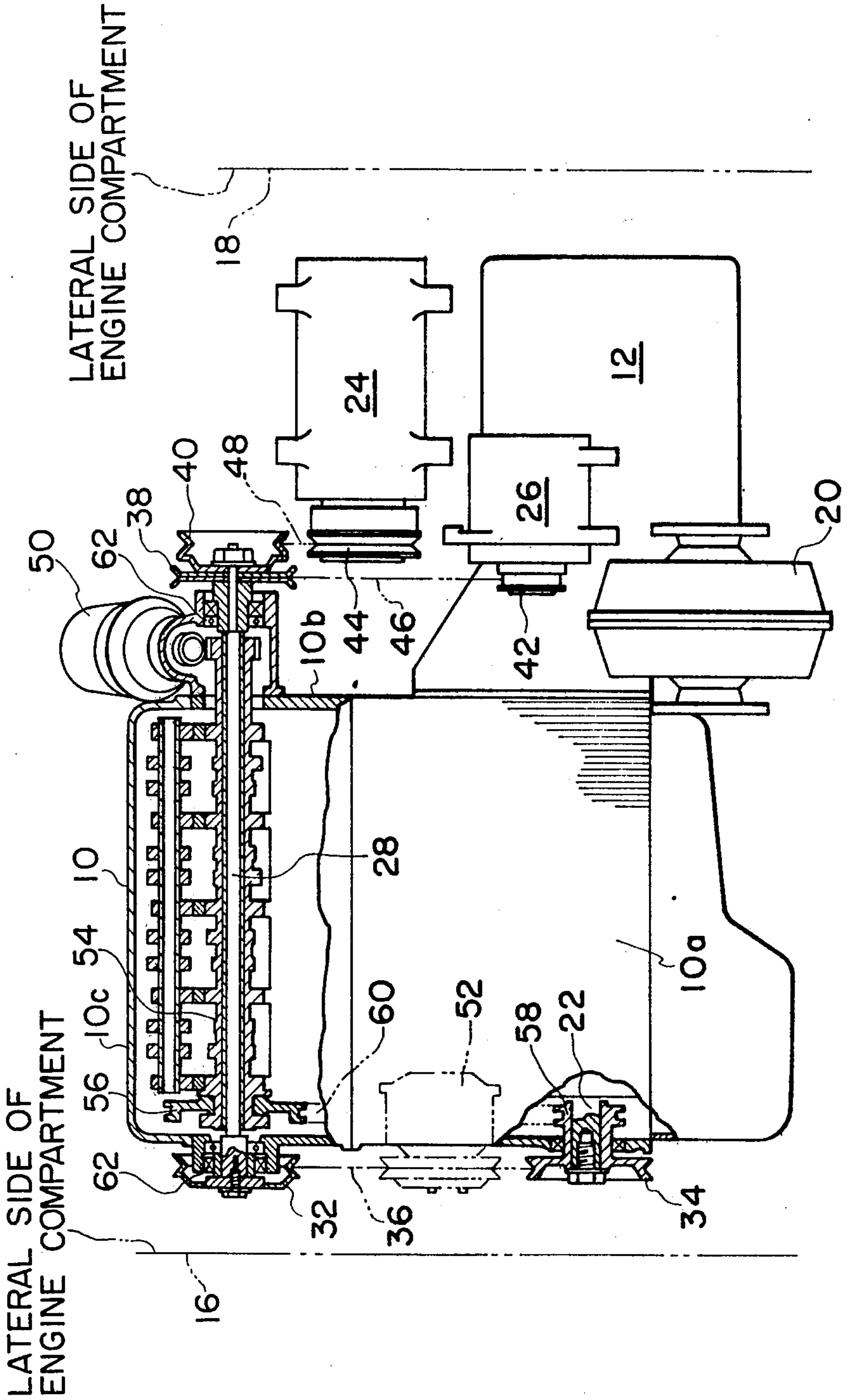
FIG. 2 is a similar view but showing a second embodiment of an accessory drive accessory drive according to the present invention.

The second embodiment shown in FIG. 2 is similar to the embodiment shown in FIG. 1, so that like parts are denoted by the same reference numerals. A feature of the second embodiment is in that an accessory drive shaft 28 extends through a hollow cam shaft 54. The hollow cam shaft 54 carries a sprocket 56 which is operatively connected with a sprocket 58 carried by the crankshaft 22 by means of a timing chain 60. The sprockets 56, 58 and the timing chain 60 are chosen such that the cam shaft 54 will rotate at a half speed of the crankshaft 22. The shaft 28 is rotatably supported at both end portions thereof by bearings 62 provided in a cylinder head 10*b*.

The operation of the second embodiment is similar to that of the first embodiment.

It is to be appreciated that in the second embodiment the arrangement wherein the accessory drive shaft 28 extends through the hollow cam shaft accommodated in the cylinder head has made the whole assembly more compact as compared to the first embodiment.

It will now be appreciated that with an accessory drive according to the present invention the whole assembly in the engine compartment can remain compact and any additional cost for the provision of the accessory drive is small due to the elimination of an step-up device.

What is claimed is:

1. In a motor vehicle having an engine compartment;

an engine in said compartment having a crankshaft extending transversely across the longitudinal axis of the vehicle, said engine having a first end and a second end which are spaced along an axis about which said crankshaft is rotatable;

a transmission mounted within said engine compartment at said second end of said engine;

an accessory disposed in said engine compartment above said transmission and adjacent said second end of said engine;

an accessory drive shaft mounted on said engine, at the upper portion thereof, and having one end projecting beyond said first end of said engine and an opposite end projecting beyond said second end of said engine;

a rotary drive connection between said one end of said accessory drive shaft and said crank shaft; and a rotary drive connection between said opposite end of said accessory drive shaft and said accessory.

2. A motor vehicle as claimed in claim 1 in which said accessory drive shaft is mounted externally of said engine and supported thereon by means of brackets provided with bearings.

3. A motor vehicle as claimed in claim 1 in which said accessory drive shaft is rotatably journalled within a hollow cam shaft of said engine.

4. In a motor vehicle having an engine compartment;

an engine in said compartment having a cylinder head and a crankshaft, said crankshaft extending transversely across the longitudinal axis of said vehicle, said engine having a first end and a second end which are spaced along an axis about which said crankshaft is rotatable;

a transmission mounted at said second end of said engine and operatively connected to said crankshaft;

an accessory drive shaft disposed externally of said engine and journalled in bearings mounted on said cylinder head, said accessory drive shaft having a first end which projects beyond said first end of said engine and a second end which projects beyond said second end of said engine;

an accessory disposed in said engine compartment above said transmission and adjacent said second end of said engine;

a first pulley disposed at said first end of said engine and connected to said crankshaft for unitary rotation therewith;

a second pulley fixedly mounted on said first end of said accessory drive shaft;

a first drive belt drivingly interconnecting said first pulley and said second pulley;

a third pulley fixedly mounted on said second end of said accessory drive shaft;

a fourth pulley mounted on said accessory and drivingly connected thereto; and a second drive belt drivingly interconnecting said third pulley and said fourth pulley.

5. In a motor vehicle having an engine compartment;

an engine in said compartment having a cylinder head and a crankshaft, said crankshaft extending transversely across the longitudinal axis of said vehicle, said engine having a first end and a second end which are spaced along an axis about which said crankshaft is rotatable, said cylinder head having a cam shaft operatively disposed therein, said cam shaft being formed with a longitudinally extending coaxial through-bore;

a transmisson mounted at said second end of said engine in said compartment and operatively connected to said crankshaft;

an accessory drive shaft journalled in said through-bore, said accessory drive shaft having a first end which projects beyond said first end of said engine and a second end which projects beyond said second end of said engine;

an accessory disposed in said engine compartment above said transmission and adjacent said second end of said engine;

a first pulley disposed at said first end of said engine and connected to said crankshaft for unitary rotation therewith;

a second pulley fixedly mounted on said first end of said accessory drive shaft;

a first drive belt drivingly interconnecting said first pulley and said second pulley;

a third pulley fixedly mounted on said second end of said accessory drive shaft;

a fourth pulley mounted on said accessory and operatively connected thereto; and a second drive belt drivingly interconnecting said third pulley and said fourth pulley.

* * * * *